United States Patent Office 3,632,687
Patented Jan. 4, 1972

3,632,687
CRYSTALLINE POLYMER ALLOYS COMPRISING A POLYMER FROM A CYCLIC ESTER AND AN ALKENE POLYMER
Earl Richard Walter and Joseph Victor Koleske, Charleston, W. Va., assignors to Union Carbide Corporation, New York, N.Y.
No Drawing. Filed Apr. 1, 1969, Ser. No. 812,430
Int. Cl. C08f 29/12
U.S. Cl. 260—896   18 Claims

ABSTRACT OF THE DISCLOSURE

Crystalline polymer blends containing crystalline alkene polymers and crystalline cyclic ester polymers containing recurring units of the formula (I)

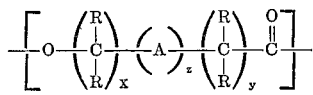

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sum of $x+y+z$ is at least 4 and not greater than 7, and (b) the total number of R variables which are substituents other than hydrogen does not exceed 3, with or without recurring units of the formula (II)

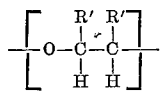

wherein each R' is selected from the class consisting of, individually, hydrogen, alkyl, cycloalkyl, aryl and chloroalkyl, and, together with the ethylene moiety of the oxyethylene chain of Unit II, a saturated cycloaliphatic hydrocarbon ring having from 4 to 8 carbon atoms.

These novel crystalline blends are useful in the production of fibers, films, wire and cable coating, molding materials and the like, having unique properties such as, dyeability, stress crack resistance, low haze, high gloss and/or high light transmission.

BACKGROUND OF THE INVENTION (a) Field of the invention

The present invention relates to novel crystalline polymer blends containing crystalline alkene polymers, such as, polyethylene or polypropylene, in intimate association with crystalline cyclic ester polymers, such as, polymers of epsiloncaprolactone, and having a wide range of application in the production of dyeable fibers, films, and other shaped articles.

(b) Description of the prior art

Attempts to prepare crystalline polymer alloys of two or more crystalline polymers have generally been unsuccessful. Even where the two polymers are compatible in the melt, they tend to separate and crystallize into segregated domains of each individual polymer species. This segregation into separate domains usually results in a marked deterioration of the physical properties which would be characteristic of either of the unblended polymers. Such behavior is especially true of polyethylene which does not readily accept or tolerate the presence of significant amounts of other polymers.

This invention now permits the blending of polyethylene, polypropylene and other alkene polymers with crystalline cyclic ester polymers to form crystalline polymer alloys having useful and desirable properties over a broad composition range. It is believed that this alloy formation lessens segregation of the two polymers into separate domains and the deleterious effects on physical properties which would be associated with such segregation.

Heretofore known polymer alloys are generally blends of noncrystallizing polymers. These polymers often exhibit a degree of mutual compatibility but without any detectable association in crystalline form. Natta et al. (G. Natta, P. Corradini, D. Sianesi and D. Morero, J. Pol. Sci. 51, 527–539 (1961)) discuss the possibility of two types of isomorphous substitution in the crystal lattice of a linear macromolecule: (a) Isomorphism of chains, and (b) Isomorphism of monomeric units.

Isomorphism of monomeric units occurs when monomer units of a different chemical structure are introduced by chemical bonds statistically along the chain of a crystallizable polymer without hindering crystallization of the resulting copolymer. This type of isomorphism differs from the types observed for small molecules because it takes place among parts of molecules linked by stable covalent bonds. This has been observed for many copolymers such as 3-methyl-1-butene/4-methyl-1-pentene copolymers (F. P. Reding and E. R. Walter, J. Poly. Sci. 37, 132, 555–558 (1959), ethylene-carbon monoxide, etc.

Natta et al. also state that isomorphism of chains in which two different types of polymer chains pack together may only occur when the macromolecular chains have identity periods which are equal or almost equal, and when they differ very little or not at all in the crystallographic unit cell dimensions normal to the chain axis. Natta et al. list as special cases of the above, (a) the isomorphous substitution between helicoidal all right- or all left-handed chains differing in the orientation of the side groups (up or down), and (b) the formation of solid solutions among polymers containing isotope atoms (e.g., polypropylene and polydeuteropropylene). Natta lists as a true case of chain isomorphism, observed by himself and coworkers, a solid solution of isotactic polystyrene with a copolymer of polystyrene and p-methylstyrene. He states that the formation of the solid solution is possible because the two different polymeric components are characterized by the same crystalline structure, the same identity period along the chain axis, and they show only small differences in the equatorial lattic dimensions. However, he was not, with the same co-fusion and crystallization conditions, able to observe the formation of solid solutions in mixtures of homopolymers of isotactic polystyrene and isotactic poly-p-methyl-styrene.

SUMMARY OF THE INVENTION

The present invention provides novel crystalline polymer blends and provides a means for readily altering the properties of such important plastics as polyethylene and polypropylene to impart highly desirable properties not easily obtained in such plastics prior to this invention.

Heretofore, it was the case that, when two crystallizable polymers were blended, each would crystallize independently of the other. An X-ray diffraction pattern of the resulting blend would be a superposition of the diffraction patterns of the two components with their overall intensities approximately proportional to their respective concentrations. Some reduction in overall crystallinity may also occur depending on the degree of compatibility of the two polymers. However, no significant alteration in relative intensity ratios would occur between the various X-ray reflections contributed by one of the components as compared with that of the unblended component.

This is not the case with the novel crystalline blends of this invention which contain crystalline cyclic ester polymers and crystalline alkene polymers, such as, polypropylene, polyethylene, poly(3-methyl-1-butene), poly(4-methyl-1-pentene) and the like.

Unlike the reported findings of Natta et al. of their work with two closely similar polymers, one made from styrene and the other made from a copolymer of styrene and the adjacent homologue p-methylstyrene, the crystalline blends of this invention are made from diverse polymers one of which contains recurring carbonyl and ether groups. In addition, unlike Natta et al.'s reported findings, X-ray diffraction studies show that the polymeric components of the crystalline blends of this invention have different identity periods along the polymer chain axis, e.g., 2.534A for polyethylene and about 17.0±0.3A for the substantial homopolymer of epsilon-caprolactone.

Crystalline cyclic ester polymers, such as, epsilon-caprolactone homopolymers and copolymers, are highly crystalline, generally crystallizing with a polymer chain in a planar, zigzag conformation. Blends of such polymers with crystalline polyethylene were found to be uniform, reasonably compatible and crystalline and to have highly useful properties. For example they can be spun into fibers having excellent fiber properties, blown into films having superior optical properties, extruded as wire and cable coverings having superior stress crack resistance, and dyed by a wide range of disperse and basic dyes. Physical properties, such as, tensile strength, elongation, melting point and crystallinity level of the blends even at substantial amounts of either component, were not significantly different from those of either unblended major component. X-ray diffraction studies of fused blends of polyethylene with cyclic ester polymers, such as homopolymers of epsilon-caprolactone, support the postulation that crystalline interaction occurs on solidification. For example, very little if any reduction and in some cases an increase in the crystallinity level occurs. The blends tend to exhibit the crystal system of the major component with a disproportionate disappearance of the crystal system of the minor component when measured by X-ray diffraction. In addition, minor changes in the crystallographic unit cell size of the major component are generally observed. Such crystalline interaction is typical of that associated with alloy formation in metals. Thus, such blends should be aptly designated as crystalline polymer alloys.

A more startling crystalline interaction has been discovered in blends of the crystalline cyclic ester polymer of epsilon-caprolactone and crystalline polypropylene, as detected through X-ray diffraction studies of blends or crystalline polymer alloys of the two polymers. This behavior is manifested by the development of a strong X-ray reflection on the first layer line corresponding to an 001 reflection from the polypropylene crystal lattice, by a slight contraction of the polypropylene lattice $a$ along the $b$ axis (approximately 0.5%), and by the development of a very strong equatorial reflection at 3.76 A. Although this reflection (3.76 A.) occurs at the same location as the 200 reflection from epsilon-caprolactone homopolymers, its intensity is not consistent with the intensity of the other very weak residual epsilon-caprolactone polymer reflections. Hence, it appears that this reflection and the strong 001 polypropylene lattice reflection may arise from alterations in the electron density of the polypropylene crystal lattice due to accommodation of epsilon-caprolactone polymer chains. The X-ray diffraction data are evidence for the uniqueness of the polypropylene/epsilon-caprolactone homopolymer crystalline polymer alloys. In more detail, in a substantial homopolymer of epsilon-caprolactone, for example, the intensity ratio of the 110 reflection to the 200 reflection at 3.76 A. is 3:1. However, in an 80/20 weight blend of polypropylene and the substantial homopolymer, the intensity ratio of the reflections occurring at the positions of the 110 reflection and the 200 reflection of epsilon-caprolactone homopolymer is reversed, becoming approximately 1:4. This represents about a twelve-fold change in the relative intensity of these two reflections indicating that they no longer arise only from residual epsilon-caprolactone homopolymer.

In addition, a strong first layer line reflection appears in oriented diffraction patterns of the blend at a position corresponding to the 001 reflection of polypropylene. This reflection is not present in oriented X-ray diffraction patterns of polypropylene alone. A slight contraction (approximately 0.5%) of the polypropylene unit cell along the $b$ axis is also apparent for the blends showing this interaction. These data can be explained as resulting from an alteration of the electron density distribution in the polypropylene crystal lattice due to crystalline interaction between the polypropylene and the cyclic ester homopolymer. A similar small contraction of the unit cell of polyethylene was noted for the crystalline polymer alloys of epsilon-caprolactone homopolymer and polyethylene.

The formation of crystalline polymer alloys was even more surprising in the case of crystalline polypropylene than in the case of crystalline polyethylene inasmuch as polypropylene crystallizes with a helican chain conformation and the crystalline cyclic ester polymer of, for example, epsilon-caprolactone, crystallizes with a planar, zigzag, extended chain conformation.

The crystalline interaction observed for the crystalline polymer alloys disclosed and claimed herein sets them apart from simple polymer blends where no such evidence of crystalline interaction is observed. The above-described ability of crystalline cyclic ester polymers to form crystalline polymer alloys with both polyethylene and polypropylene, even though the polymer chain conformation in these two polymers is quite different, is indeed startling.

The term "alkene polymer" as used herein means polymers obtained by the polymerization of alkenes and includes such polymers as polyethylene, polypropylene, poly(3-methyl-1-butene), poly(4-methyl-1-pentene) and the like. Polymers of this type are usually characterized by a high level of crystallinity and are relatively inexpensive and, as regards polyethylene and polypropylene, are widely available in massive quantities. Small amounts of comonomers, insufficient to drastically reduce crystallinity, can be copolymerized in the alkene polymers used in this invention and the term "alkene polymers" is intended to include such copolymers.

The crystalline cyclic ester polymers which are contemplated in the practice of the invention are those which possess a reduced viscosity value of at least about 0.1, and desirably from about 0.2 to about 15, and higher. The preferred polymers of cyclic esters for many applications have a reduced viscosity value of from about 0.3 to about 5. These polymers are further characterized by the following structural linear Unit I:

(I)

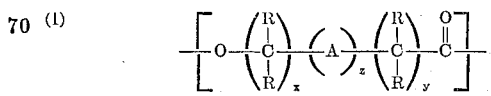

wherein each R, individually, is selected from the class consisting of hydrogen, alkyl, halo and alkoxy; A is the oxy group; $x$ is an integer from 1 to 4; $y$ is an integer from 1 to 4; $z$ is an integer of zero or one; with the provisos that (a) the sum of $x+y+z$ is at least 4 and not greater than 7, and (b) the total number of R variables which are substituents other than hydrogen does not exceed 3, preferably does not exceed 2, per unit. Illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed twenty.

In one embodiment, highly desirable crystalline cyclic ester polymers which are contemplated are characterized by both recurring structural Unit I supra and recurring structural Unit II:

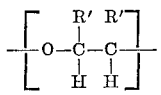

wherein each R' is selected from the class consisting of, individually, hydrogen, alkyl, cycloalkyl, aryl, and chloroalkyl, and, together with the ethylene moiety of the oxyethylene chain of Unit II, a saturated cycloaliphatic hydrocarbon ring having from 4 to 8 carbon atoms, desirably from 5 to 6 carbon atoms. It is preferred that recurring Unit II contains from 2 to 12 carbon atoms. Illustrative R' variables include methyl, ethyl, n-propyl, isopropyl, t-butyl, the hexyls, the dodecyls, 2-chloroethyl phenyl, phenethyl, ethylphenyl, cyclopentyl, cyclohexyl, cycloheptyl, and the like. It is preferred that R' be hydrogen; lower alkyl, e.g., methyl, ethyl, n-propyl, isopropyl; chloroalkyl, e.g., 2-chloroethyl; and the like.

The presence of units of Formula II in the cyclic ester polymer has the effect of reducing crystallinity somewhat. It has been found, however, that amounts of up to 30 mol percent of Unit III based on the combined amount of Units I and II can be employed in many cases without an unacceptable loss of crystallinity. In certain instances more than 30 mole percent of Units II can be acceptable.

The aforedescribed recurring linear unit (I) is interconnected through the oxy group (—O—) of one unit with the carbonyl group

of a second unit. In different language, the interconnection of these units does not involve the direct bonding of two carbon groups, i.e.,

With relation to the relatively high molecular weight cyclic ester polymers, the terminal moieties thereof are not determinable by infra-red analysis which factor is readily understandable since macromolecules are involved. On the other hand, the relatively lower molecular weight cyclic ester polymers, e.g., those having reduced viscosity values below about 0.25 are characterized by end groups which can be hydroxyl; carboxyl; hydrocarbyl such as alkyl, cycloalkyl, aryl, aralkyl, and alkaryl; hydrocarbyloxy such as, alkoxy, cycloalkoxy, aryloxy, aralkoxy, and alkaryloxy; and possibly other moieties such as catalyst residue; and mixtures of the foregoing. It may be desirable in certain instances that the hydroxyl and carboxyl end groups, if present, be esterified or acylated to render them inert such as by reacting the hydroxyl moiety with a monocarboxyl compound or its corresponding anhydride, e.g., acetic acid, acetic anhydride, butyric acid, 2-ethylhexanoic acid, benzoic acid, etc., or by reacting the carboxyl moiety with a monohydroxyl compound such as a monohydric alcohol or monohydric phenol, e.g., methanol, 2-ethylhexanol, isobutanol, phenol, and the like.

When the cyclic ester polymers are prepared from a mixture containing the cyclic ester monomer and minor amounts of a cyclic ether which is copolymerizable therewith, e.g., alkylene oxide, oxetane, tetrahydrofuran, etc., the polymeric chain of the resulting copolymeric product will be characterized by both recurring linear Unit I supra as well as the recurring linear Unit II which would represent the alkylene oxide comonomer polymerized therewith. When the comonomer is an alkylene oxide, then the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—O—) of recurring linear Unit II is interconnected with the carbonyl group

of recurring linear Unit I supra or with the alkylene moiety of a second oxyalkylene Unit II.

Particularly preferred polymers of cyclic esters are those which are characterized by the oxypentamethylene-carbonyl chain as seen in recurring structural Unit III:

(III)
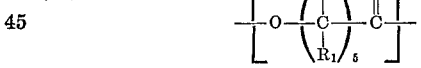

wherein each $R_1$ is hydrogen or lower alkyl, preferably hydrogen or methyl, with the proviso that no more than three $R_1$ variables are substituents other than hydrogen.

The preparation of the cyclic ester polymers are well documented in the patent literature as exemplified by U.S. Pat. Nos. 3,021,309 through 3,021,317; 3,169,945; 3,274,123; 3,305,605; 3,324,070 and 2,962,524 and Canadian Pat. No. 742,294. Briefly, the process involves the polymerization of an admixture containing at least one cyclic ester monomer with or without a functional (e.g., active hydrogen-containing) initiator therefor, and a suitable catalyst, the choice of which will depend on the presence or absence of added initiator.

Suitable monomer cyclic esters which can be employed in the manufacture of the cyclic ester polymers are best illustrated by the following formula:

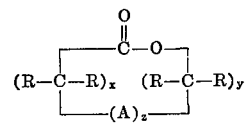

wherein the R, A, $x$, $y$, and $z$ variables have the significance noted in Unit I supra.

Representative monomeric cyclic esters which are contemplated include, for example, delta-valerolactone; epsilon-caprolactone; zeta-enantholactone; eta-caprylolactone; the mono-alkyl-delta-valerolactones, e.g., the monomethyl-, monoethyl-, monohexyl-, delta-valerolactones, and the like; the dialkyl-delta-valerolactones, e.g., the dimethyl-, diethyl-, and di-n-octyl-delta-valerolactones, and the like; the monoalkyl-, dialkyl-, and trialkyl-epsilon-caprolactones, e.g., the monomethyl-, monoethyl-, monohexyl-, dimethyl-, diethyl-, di-n-propyl, di-n-hexyl, trimethyl-, triethyl, and tri-propyl-epsilon-caprolactones, and the like; the monoalkoxy- and dialkoxy-delta-valerolactones and epsilon-caprolactone, e.g., the monomethoxy-, monoisopropoxy-, dimethoxy-, and diethoxy-delta-valerolactones and epsilon-caprolactones, and the like; 1,4-dioxane-2-one, dimethyl-1,4-dioxane-2-one, and the like. A single cyclic ester monomer or mixtures of such monomers may be employed.

In the absence of added functional initiator, the polymerization process is desirably effected under the operative conditions and in the presence of anionic catalysts as noted in U.S. Pat. Nos. 3,021,309 to 0,021,317, such as, dialkylzinc, dialkylmagnesium, dialkylcadmium, trialkylaluminum, dialkylaluminum alkoxide, alkylaluminum dialkoxide, dialkylaluminum halide, aluminum trialkoxide, alkyllithium, and aryllithium. Specific anionic catalysts would include di-n-butylzinc, diethylmagnesium, di-n-butylmagnesium, dimethylcadmium, diethylcadmium, di-t-butylcadmium, triethylaluminum, triisobutylaluminum, tri-2-ethylhexylaluminum, aluminum triisopropoxide, aluminum triethoxide, ethyllithium, n-butyllithium, phenyllithium, and the like.

When employing an admixture containing cyclic ester monomer and functional initiator which possesses at least one active hydrogen substituent, e.g., amino, carboxyl, and hydroxyl, it is desirable to use the catalysts noted in U.S. Pat. Nos. 2,878,236, 2,890,208, 3,169,945, and 3,284,417 under the operative conditions discussed therein. In these processes the active hydrogen substituent on the initiator is capable of opening the monomer cyclic ester ring whereby said cyclic ester is added to said initiator as a substantially linear group thereto. The molecular weight of the resulting polymers of cyclic ester can be predetermined by controlling the molar ratios of cyclic ester monomer to be added to the functional initiator. Amino and hydroxyl substituents on the initiator will result in polymeric products having hydroxyl end-group. Carboxyl substituents on the initiator will result in polymeric products having carboxyl end-groups. The initiator with the active hydrogen atom will thus be contained in the final polymeric molecule. The esterification or acylation of the aforementioned end-groups has been described previously and is voluminously documented in the art.

Polymers of cyclic esters can also be manufactured via the process described in U.S. Pat. No. 2,962,524. In this process, a monomeric admixture comprising cyclic ester and alkylene oxide which desirably has the formula:

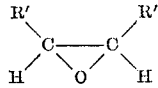

wherein each R', individually, has the meanings noted in Unit II supra, can be reacted with a monofunctional and/or polyfunctional (e.g., active hydrogen-containing initiator possessing amino, hydroxyl, and/or carboxyl groups, preferably in the presence of a Lewis acid catalyst such as boron trifluoride. Illustrative alkylene oxides would include ethylene oxide, propylene oxide, the butylene oxides, styrene oxide, epichlorohydrin, cyclohexene oxide, and the like.

Cyclic ester/alkylene oxide copolymers can also be prepared by reacting in the absence of an active hydrogen-containing initiator an admixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30° C. of from about 0.3 to about 1.0), in the presence of an inert normally-liquid saturated aliphatic hydrocarbon vehicle such as heptane, phosphorus pentafluoride as the catalyst therefor, at an elevated temperature, e.g., about 80° C., and for a period of time sufficient to produce such cyclic ester/alkylene oxide copolymers.

The cyclic ester polymers employed herein contain in the polymeric chain greater than about 70, preferably about 80, to about 100 mol percent of Units I and about 0 to about 30, preferably up to about 20, mol percent of other units such as alkylene oxide Units II, initiator residues or moieties, catalyst residues, and other difunctional and/or monofunctional units. The cyclic ester polymers containing about 100 mol percent of Unit I are preferred and those in which Unit I represents the oxypentamethylene carbonyl moiety are most preferred.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other organic solvent for the polymer may be used) at 30° C.

The cyclic ester polymer can be fluxed on a mill and sheeted off to form sheets or films. It can be extruded as a tape, rope, or other shape or can be extruded and pelletized. When formed by the dispersion polymerization technique, the cyclic ester polymer is obtained in powder or granular form. It can also be dissolved in a suitable solvent, such as, benzene, toluene, 2-nitropropane, methylene chloride and other solvents. Methylene chloride and other fast drying solvents are preferred when the cyclic ester is used as a solution. The cyclic ester polymer can be employed in this invention in any of the above forms, although it is usually preferred to employ it in the form of powders, granules or pellets.

The relative proportions of crystalline cyclic ester polymer blended with the crystalline alkene polymer to form the novel crystalline polymer alloys of this invention are not narrowly critical. Because of the relative cheapness and wide availability of massive quantities of the alkene polymer, especially polyethylene and to a somewhat lesser extent polypropylene, it may be desirable to employ major amounts of the alkene polymer. However, crystalline polymer alloys of high quality and superior properties can be obtained over the range of about 0.25 to about 90% crystalline cyclic ester polymer and about 99.75 to 10% of the crystalline alkene polymer, based on the total weight of both types of polymers.

A surprising aspect of the present invention is the discovery that improved properties are obtained when even very small amounts of the cyclic ester polymer are used. For many purposes, it is preferable to employ proportions in the range of about 0.5 to about 15% crystalline cyclic ester polymer and about 99.5 to about 85% crystalline alkene polymer on the above-mentioned basis.

The crystalline polymer alloys of this invention are readily made by blending the selected amounts of crystalline cyclic ester polymer and crystalline alkene polymer with the application of heat in any suitable apparatus.

It is usually necessary to apply sufficient heat to raise the polymers above their respective crystalline melting temperature. Representative temperatures to be employed in blending the polymers are, for example 100° C. or more but not so high that significant decomposition of any of the polymers or other ingredients takes place. Temperatures as high as 180 to 250° C. can be employed, if desired, although lower temperatures are usually suitable and economically preferred.

Suitable equipment for fluxing the polymers together include Banbury mixers, screw extruders, two-roll mills, etc. The time of blending or fluxing is not narrowly critical and a sufficient blending time to obtain a substantially uniform blend is usually satisfactory. Mixing of the cyclic ester polymer with the alkene polymer in the heated or molten state is believed to be facilitated by the partial hydrocarbon nature of the cyclic ester polymer. Phase separation and the accompanying loss of physical properties experienced in prior art attempts to blend two different crystalline polymers is surprisingly lessened in blending the two different crystalline polymers to form a crystalline polymer alloy in accordance with the present invention.

Illustrative times of blending are in the range of 1 or 2 minutes to 30 minutes or an hour. In the usual case, about 5 to 15 minutes is adequate. After adequate blending, the blend is cooled below the crystallization temperatures and the resulting crystalline polymer alloy can be shaped and/or formed in any desirable manner.

If desired, other materials can be added during blending to the extent that the type and amount of such added materials do not drastically reduce or eliminate the crystalline structure of the blend when cooled below the crystallization temperature. Such added materials can include fillers, dyes, plasticizers, antioxidants, light stabilizers, heat stabilizers, etc., and are of the usual types and are used in the usual amounts employed in alkene polymers such as polyethylene.

The crystalline polymer alloys of the present invention have improved physical properties which are at least akin to the physical properties of the major component of the polymer alloy. In addition, the novel polymer alloys have properties not heretofore attained in cyclic ester polymers alone or in alkene polymers alone, while retaining the desired properties of the major component. They are readily dyeable to shades of a depth not heretofore attainable to even a small extent with alkene polymers such as polyethylene and/or polypropylene alone. Furthermore, optical properties, such as, reduced haze, increased gloss and increased light transmission are attainable in the polymer alloys of this invention to an extent not heretofore attainable with polyethylene or polypropylene alone. Another very important property is attained in the crystalline polymer alloys of this invention is that they are far superior in stress crack resistance at or below room temperature as compared to polyethylene alone. Still furthermore, the novel polymer alloys in thin film form exhibit a significantly lower tendency to static type blocking than do thin films made from polyethylene alone. Through the use of selected types of initiators for the cyclic ester polymer component, it is also possible to introduce desired types of groups into the crystalline polymer alloy, thus readily permitting desired modifications to the alkene polymer.

Crystalline polymer alloys made in accordance with the invention can be extruded and spun into fibers having physical properties at least as good as fibers extruded and spun from each of the polymeric components alone and, still, can be dyed in wide ranges of colors and shades. Also, the novel crystalline polymer alloys can be extruded and blown into tubular films which can be dyed in a wide range of colors and shades and are also printable. The novel crystalline polymer alloy of this invention can be compression molded in a wide variety of shapes and forms of articles. Such shapes and forms can be readily dyed than similar shapes and forms made of polyethylene alone or polypropylene alone.

A convenient method of determining polymeric crystallinity for the purposes of this invention is described in the Textbook of Polymer Science, Fred W. Billmeyer, Interscience Publishers, Division of John Wiley & Sons, 1962 at pages 161–163. In this method the weight fraction of crystallinity, $w_c$, is determined by the formula:

$$w_c = \frac{(V_a - V)}{(V_a - V_c)}$$

wherein V is the specific volume (reciprocal of measured density) of the polymeric sample and symbol $V_a$ is the specific volume of the substantially complete amorphous phase of the same type of polymer, $V_c$ is the specific volume of the substantially complete crystal phase of the same type of polymer, $V_c$ and $V_a$ have been determined for a wide variety of homopolymers and many copolymers and such values are available in the literature. $V_c$ values are determined from X-ray unit cell dimensions and suitable methods for doing so are described in the above publication and related references cited therein. $V_a$ values are obtained by extrapolation of the specific volumes of polymer melts as described in this same publication. As measured by this method, the alkene polymer, the cyclic ester polymer and the blends or alloys thereof, are considered to be crystalline in this invention when they exhibit at least about 20% crystallinity and preferably at least about 30% crystallinity as measured by this method.

DESCRIPTION OF SPECIFIC EMBODIMENTS

The following examples are presented. Unless otherwise specified, all percentages and parts are by weight, all temperatures are on the centigrade scale, and all reduced viscosities are measured at a concentration of 0.2 gram of polymer in 100 milliliters of benzene at about 30° C. The melt index values for polyethylene were obtained at 44 p.s.i. and 190° C. Figures given for physical properties in the tables below are averages of test results on two or more samples of each material and, in some instances, such averages have been rounded off.

The testing for physical properties was done on an Instron tensile tester using specimens about ¼ inch wide, 0.020 to 0.030 inch thick and about one inch in gauge length. Gauge length is the length of the specimen between the jaws of the testing apparatus. The secant modulus or stiffness was determined at a strain rate of 10% in inches per inch per minute and the other tensile property at a strain rate of 100% in inches per inch per minute.

Secant modulus or stiffness

This value was determined by subjecting the specimen to tensile stress and elongating it 1%. The modulus is then calculated as the ratio of the tensile stress (T) needed to elongate the sample 1% of its original length to the elongation (or strain) of the specimen. 1% Secant Modulus for a 1 in. specimen = T/0.01 = 100T.

Yield stress

This value was determined as the stress at the first major break in the stress-strain curve and usually corresponds to the necking-in point.

Tensile strength or ultimate strength

This value was determined as the tensile stress at rupture of the specimen. It was calculated from the load on the specimen at rupture, divided by the original cross-sectional area.

Elongation

This value was determined as the extension of the specimen at the point of break or rupture.

$$\text{Percent elongation} = \frac{L - L_o}{L_o} \times 100\%$$

L = length at rupture
$L_o$ = initial length of specimen.

Rupture energy

This value was determined as the area under the entire stress-strain curve when the sample is subjected to tensile stress up to the rupture point.

Strain rate

This value is the rate at which the sample is being elongated relative to its original dimension. Thus, if a one inch gauge length sample is used and the cross head of the testing apparatus is driven at a speed of one inch per minute, the strain rate is the ratio of gauge length to this speed or one inch divided by one inch per minute which is a rate of one inch per inch per minute. This value is reported hereinbelow as a percent, in which case the ratio is multiplied by 100%.

EXAMPLE 1

Several crystalline polymer alloys were prepared as shown in Table I from a low density polyethylene having approximately 50% crystallinity and a density at 23° C. of 0.916 to 0.919 and a melt index 1.7 to 2.4 dg./min. and substantial homopolymers (PCL) of epsilon-caprolactone of different molecular weights. The proportions of PCL as well as physical properties of the resulting crystalline polymer alloys are shown in Table I.

The cyclic ester polymers used in the polymer alloys were prepared as follows:

PCL-1: bulk polymerization of epsilon-caprolactone in the presence of 1% di-n-butyl zinc catalyst based on the weight of caprolactone by heating about 90° C. for 24 hours. The cyclic ester polymer had a reduced viscosity of about 0.62.

PCL-2: same as PCL-1 except that polymerization was conducted at 40° C. for 24 hours. The cyclic ester polymer had a reduced viscosity of about 0.54.

PCL-3: same as PCL-1 except that polymerization was conducted at 60° C. for 24 hours and 0.8%, instead of 1%, di-n-butyl zinc was used. The cyclic ester polymer had a reduced viscosity of about 2.23.

PCL-4: same as PCL-3 except that 1.3 mole percent, instead of 0.8 weight percent, of di-n-butyl zinc was used, based on moles of caprolactone. The cyclic ester polymer had a reduced viscosity of about 1.38.

PCL-5: solution polymerization of epsilon-caprolactone as a 30% solution in toluene in the presence of about 1% di-n-butyl zinc catalyst. The cyclic ester polymer had a reduced viscosity of about 1.69.

The crystalline polymer alloys were prepared by milling on a two-roll mill the various proportions of PCL and polyethylene as shown in Table I. Milling was conducted for 5 to 30 minutes at 110° C. During milling of all of the polymer alloys set forth in Table I, fluxing and banding were observed to be good and all exhibited quite acceptable bank behavior. Also, roll release, dispersion and hot strength were good during milling. Each polymer alloy was sheeted off the mill and the resulting sheets were cooled. All were translucent, flexible, only slightly discolored and all had a smooth surface. A control containing no PCL and a control containing 100% PCL were also milled and tested in the same manner. The physical properties of the resulting sheets were measured and are presented in Table I.

TABLE I

| | A | B | C | D | E | F | G | H | I | J | K | L | M |
|---|---|---|---|---|---|---|---|---|---|---|---|---|---|
| Weight percent PCL | 0 | 2 | 5 | [1] 1 | 15 | 20 | 30 | 40 | 50 | 60 | 70 | 90 | 100 |
| 1% secant modulus, p.s.i.[2] | 20,300 | 16,700 | 16,700 | 18,100 | 17,400 | 15,000 | 19,000 | 21,300 | 30,600 | 25,400 | 24,000 | 22,000 | 20,000 |
| Yield stress, p.s.i. | 1,200 | 1,200 | 1,200 | 1,200 | 1,200 | 1,050 | 1,200 | | | | 1,300 | 1,400 | 1,580 |
| Tensile strength, p.s.i. | 1,900 | 1,900 | 1,900 | 1,800 | 1,700 | 1,300 | 1,600 | 770 | 790 | 1,055 | 2,600 | 5,500 | 7,300 |
| Elongation, percent | 900 | 910 | 900 | 850 | 800 | 1,300 | 600 | 250 | 65 | 183 | 800 | 1,100 | 1,200 |
| Rupture energy, in.-lbs./in.[3] | 12,000 | 12,500 | 12,000 | 11,000 | 10,000 | 14,000 | 8,300 | 1,750 | 470 | 1,937 | 13,500 | 29,700 | 40,000 |
| Strain rate, percent, in./min. ÷ in./min. | 100 | 100 | 100 | 100 | 100 | 100 | 100 | 100 | 100 | 100 | 100 | 100 | 100 |
| PCL type (reduced viscosity) | | PCL-1 (0.62) | PCL-2 (0.54) PCL-3 (2.2) | PCL-1 (0.62) PCL-3 (2.2) | PCL-3 (2.2) | PCL-3 (2.2) | PCL-3 (2.2) | PCL-5 (0.69) | PCL-5 (0.69) | PCL-4 (1.38) | PCL-3 (2.2) | PCL-3 (2.2) | PCL-3 (2.2) |

[1] Averages of measurements on blends with two similar PCL's as shown below.
[2] 1% secant modulus values obtained at 10% strain rate [(in./in./min.) · (100%)].

EXAMPLE 2

A crystalline polymer alloy was made from 9 parts of a high density polyethylene having a density of 0.96 g./cc. and a melt index of 5 dg./min. and 1 part of the cyclic ester polymer of epsilon-caprolactone identified as PCL-2 in Example 1. The milling behavior as described in Example 1 was good and the alloy was milled for about 5 minutes at 140° C. When the resulting sheet was cooled it was translucent, stiff, off-white and smooth. The resulting crystalline alloy was compression molded at 140° C. and 500 p.s.i. for 10 seconds to form a molded plaque.

The above-mentioned high density polyethylene was milled in the absence of cyclic ester polymer for 5 minutes at 140° C. to provide a sheet which was white in color and transparent, stiff and slightly rough. The sheet also could be compression molded to form a plaque under the same conditions as described above.

EXAMPLE 3

A crystalline polymer alloy was prepared from 8 parts of the high density polyethylene described in Example 2 and 2 parts of the crystalline polymer alloy prepared in Example 2, by milling the mixture on a two-roll mill for 5 minutes at 140° C. All milling characteristics as described in Example 1 of the crystalline polymer alloy were found to be good and the resulting polymer alloy had similar properties as the polymer alloy described in Example 2.

EXAMPLE 4

A crystalline polymer alloy was prepared using 95 parts of the high density polyethylene described in Example 2 and 5 parts of the cyclic ester polymer described as PCL-3 in Example 1. The mixture was blended on a two-roll mill at 145 to 150° C. for about 5 minutes and the milling behavior as described in Example 1 was good for this polymer alloy as well. The resulting crystalline polymer alloy was sheeted, cooled, broken up to a fine particle size and dried for 2 hours at 50° C. under vacuum of 1 mm. Hg. The resulting crystalline alloy powder was then extruded from a spinnerette to produce a fine denier yarn having physical properties which were better than the physical properties of yarn spun from the abovementioned high density polyethylene which did not contain cyclic ester polymer. In addition, the yarn made from the crystalline polymer alloy was readily dyeable with selected basic dyestuffs and with disperse dyestuffs to full shades whereas the yarn formed from polyethylene alone could only be tinted.

EXAMPLE 5

One blend of the low density polyethylene as described in Example 1 and carbon black was prepared and 4 crystalline polymer alloys were prepared from this low density polyethylene, carbon black and substantial homopolymers of epsilon-caprolactone as defined in Table II below. The blends were prepared in a Brabender mixer at 160° C. for 90 minutes. Each blend or crystalline alloy was aged 18 hours at 70° C.

The cyclic ester polymers employed are presented below:

PCL-6: bulk polymerization of epsilon-caprolactone using 1.25 mole percent di-n-butyl zinc catalyst to provide a polymer having a reduced viscosity of 0.26.

PCL-7: solution polymerization of epsilon-caprolactone as a 30% solution in toluene in the presence of 1 mole percent di-n-butyl zinc catalyst to provide a polymer having a reduced viscosity of 0.11.

PCL-8: bulk polymerization of epsilon-caprolactone using 1 mole percent di-n-butyl zinc catalyst to provide a polymer having a reduced viscosity of 1.38.

PCL-9: solution polymerization of epsilon-caprolactone as a 70% solution in toluene using 1 mole percent di-n-butyl zinc catalyst to provide a polymer having a reduced viscosity of 0.77.

The weight percentages are given in Table II below.

Test strips (ten of each of the blend and polymer alloys) were then compression molded from each of the blends without PCL and the crystalline polymer alloys.

Each strip was tested under standard conditions by subjecting it to a stressed condition by blending the strip and immersing it in a hostile environment, i.e., a 10% aqueous solution of a non-ionic surfactant (an alkyl phenoxy polyoxyethylene ethanol), while maintained in the stressed condition for a period of 1 or more days. Under these conditions as shown in Table II, all 10 strips made from the polyethylene-carbon black blend broke within one day or less. In contrast, all 40 strips made from the crystalline alloys survived the test for more than 21 days with the exception of one strip which broke in the period between 3 and 21 days.

Another set of strips was pre-treated by heating them to 145° C. and then cooled to room temperautre at the rate of 50° C. per hour. This set of pre-treated strips was then subjected to the above-mentioned standard test conditions and the results are shown in Table II. It is noted that all 10 of the strips made from the blend containing no PCL failed within one day whereas all 40 of the strips containing cyclic ester polymer did not fail even after 21 days.

TABLE II

| | Polyethylene | Carbon black | Percent of— | | | | Stress-crack test, days | | | | Stress-crack test after heat-cool pretreatment, days | | | |
|---|---|---|---|---|---|---|---|---|---|---|---|---|---|---|
| | | | PCL-6 | PCL-7 | PCL-8 | PCL-9 | 1 | 2 | 3 | 21 | 1 | 2 | 3 | 21 |
| A | 97.4 | 2.6 | | | | | 10 | | | | 10 | | | |
| B | 92.4 | 2.6 | 5 | | | | 0 | 0 | 0 | 1 | 0 | 0 | 0 | 0 |
| C | 92.4 | 2.6 | | 5 | | | 0 | 0 | 0 | 0 | 0 | 0 | 0 | 0 |
| D | 92.4 | 2.6 | | | 5 | | 0 | 0 | 0 | 0 | 0 | 0 | 0 | 0 |
| E | 92.4 | 2.6 | | | | 5 | 0 | 0 | 0 | 0 | 0 | 0 | 0 | 0 |

EXAMPLE 6

A series of crystalline polymer alloys were prepared from isotactic, high molecular weight, commercial fiber grade polypropylene having a melt flow of about 12 dgm./min. (44 p.s.i. and 230° C.) and a substantial homopolymer of epsilon-caprolactone as described in Table III below. The crystalline polymer alloys were prepared by making various amounts of the polypropylene and cyclic ester polymers (PCL) as listed in the table (as well as 0.5% of a typical antioxidant and ultra violet light stabilzer) on a two-roll mill at 160° C. for about 10 minutes. The polymer alloys were sheeted off of the mill, cooled, chipped to fine particle size and dried at 90° C. in a vacuum oven. Each polymer alloy and an unmodified polypropylene (control) were extruded through a 25 hole, 0.03 inch spinnerette at a polymer temperature of about 285° C. and were packaged at 465 f.p.m. The spun yarn was subsequently stretched at the maximum draw ratio at which good continuity occurred in a stretching tube with 22 p.s.i. steam.

The resulting yarns were then dyed with a variety of dyes as shown in the table and the dying results for each yarn are also shown in Table III.

EXAMPLE 10

A master batch was prepared from 92 parts of a non-nucleated homopolymeric polypropylene polymer having

TABLE III

|  | | PCL polymer | | PCL-ETO copolymer | |
| --- | --- | --- | --- | --- | --- |
| Weight percent PCL | 0 (control) | 5 | 10 | 5 | 10 |
| PCL and reduced viscosity. | | PCL-3 (2.2) [1] | PCL-10 (0.70) [2] | PCL-11 (0.18) [3] | PCL-12 (1.32). [4] |
| Hours blend dried | | 3 | 2 | 2 | 5. |
| Times original length stretched (22 p.s.i. steam). | 4.60 | 4.60 | 4.20 | 4.60 | 4.60. |
| Denier | 131 | 114 | 136 | 123 | 124. |
| Tenacity, g.p.d | 4.86 | 5.1 | 4.47 | 4.9 | 4.80. |
| Elongation, percent | 26.8 | 44 | 25.6 | 44 | 26.1. |
| Stiffness, g.p.d | 55.3 | 47 | 48.2 | 53 | 47.8. |
| Celliton Fast Red, GGA. | Tinted only | Deep rust | Deep red | Deep red | Deep red. |
| Sevron Red GL | do | Light pink | Pink | Pink | Pink. |
| Sevron Blue 5G | do | Light blue | Blue | Light blue | Light blue. |
| DuPont Victoria Green. | do | Light green | Deep green | Light green | Sea green. |
| Genacron Blue GGL | | | Blue | | Blue. |
| Celliton Fast Yellow GGLL. | | | Bright yellow | | Bright yellow. |

[1] See Example 1.
[2] PCL-10: PCL prepared by a solution polymerization process using 70% epsilon-caprolactone in 30% toluene, 1 mole percent di-n-butyl zinc based on moles of epsilon-caprolactone and having reduced viscosity of 0.7.
[3] PCL-11: Copolymer prepared by a solution polymerization of epsilon-caprolactone and ethylene oxide as a 50% solids solution in benzene using a mole ratio 70:30 epsilon-caprolactone: ethylene oxide using phosphorus pentafluoride catatlyst at 50° C. for 24 hours, the resulting PCL-11 having a reduced viscosity of 0.18.
[4] PCL-12: Copolymer prepared in a similar manner as PCL-11 except that a smaller amount of phosphorus pentafluoride catalyst was used resulting in a copolymer (PCL-12) having a reduced viscosity of 1.32.

EXAMPLE 7

A crystalline polymer alloy containing 90% of the high density polyethylene referred to in Example 2 and 10% of a cyclic ester copolymer was prepared. The cyclic ester copolymer was prepared by suspension polymerization in heptane of epsilon-caprolactone and tetrahydrofuran in a mole ratio of 70 to 30, respectively, in the presence of phosphorus pentafluoride catalyst in the absence of added surfactant or other interfacial agent. The resulting copolymer had a reduced viscosity of 0.68.

The crystalline polymer alloy was formed by blending 9 parts of the polyethylene and 1 part of the above-described copolymer on a two-roll mill at 140° C. for about 10 minutes. It was observed that all milling characteristics were good. The resulting crystalline polymer alloy could be compression molded into plaques or other articles which are dyeable with disperse dyestuffs. In addition, the resulting polymer alloy could be extruded and spun into a dyeable yarn.

EXAMPLE 8

A crystalline polymer alloy was prepared by blending 19 parts of an isotactic, high molecular weight, commercial fiber grade polypropylene having a melt flow of about 12 dg./min. (44 p.s.i. and 230° C.) and about 1 part of a cyclic ester polymer as described below on a two-roll mill at 170° C. for about 5 minutes.

The cyclic ester polymer used in this example was a substantial homopolymer of 2,2 - dimethylvalerolactone prepared by bulk polymerization using phosphorous pentafluoride catalyst and having a reduced viscosity of 0.32.

All milling characteristics of the blended polymers were good. The resulting crystalline polymer alloy could be compression molded into plaques which are dyeable. In addition, the crystalline polymer alloy could be extruded and spun into a yarn which is dyeable.

EXAMPLE 9

A crystalline polymer alloy was prepared by milling 5 parts of the crystalline polymer alloy obtained in Example 8, 3 parts of additional polypropylene as identified in Example 8 and 2 parts of carbon black powder. These materials were blended on a two-roll mill at 170° C. for 5 minutes and all milling characteristics were found to be good. The resulting crystalline polymer alloy contained a total of 31 parts polypropylene, 1 part cyclic ester polymer and 8 parts carbon black and could be compression molded to form shaped articles such as plaques.

an approximate melting temperature of about 165° C. and a melt flow of about 1 dg./min. at 44 p.s.i. and 230° C. and 8 parts of a cyclic ester substantial homopolymer (PCL) of epsilon-caprolactone having a reduced viscosity of about 1.46. The PCL used herein was a dry blend of three batches of PCL powders made by dispersion polymerization in heptane using vinyl chloride/lauryl methacrylate copolymer as interfacial agent. Two of the batches were made in the presence of di-n-butyl zinc and had respective reduced viscosities of 1.3 and 1.98. The third batch was made in the presence of n-butyllithium and had a reduced viscosity of 1.63. The three batches were mixed in the amounts of 40% of the batch having a reduced viscosity of 1.3, 38% of the batch having a reduced viscosity of 1.98 and 22% of the batch having a reduced viscosity of 1.63. The reduced viscosity of the mixture of the three batches was measured to be 1.46.

The master batch was made in suitable equipment by melt-blending the granular forms of the polypropylene and cyclic ester polymer. Then various proportions of the master batch were dry blended with the above-described polypropylene in sufficient amounts to provide the concentrations of PCL listed in Table IV.

The melt-blending to form the master batch and also the final blends was achieved quite readily and uniform blends were obtained in every case.

Each resulting crystalline polymer alloy was extruded as a tube through a one-inch extruder fitted with a one-inch circular die and a bubble of about 5 in. in circumference was formed from the extruded tube. The thickness of the film making up the bubble or expanded tube was about 20 mils. Thereafter, the film bubble or tube was cooled to room temperature and reheated to the orientation temperature range of about 140 to about 145° C. and the tube was further inflated to about 5.5 times its diameter. At the same time, the film was pulled at a faster rate than it was being fed to the second bubble and there resulted substantial orientation in the machine direction as well as in the lateral direction. The resulting film was about 0.7 mil thick. The resulting biaxially oriented film was cooled and tested for physical properties, the results of which are listed in Table IV below. In addition, the above-described polypropylene without any PCL addition was extruded and double-bubble oriented in the same manner as described above.

As shown by the physical properties listed in Table IV, the haze, gloss and light transmission of the crystalline polymer alloys containing PCL., especially at the 1 and 4% levels, are significantly improved, without significant loss in other physical properties, as compared to polypropylene films which did not contain PCL.

TABLE IV

| | Concentration of PCL, percent | | | |
|---|---|---|---|---|
| | 0 | 0.5 | 1.0 | 4.0 |
| Haze, percent [1] | 4.1 | 5.5 | 1.0 | 2.1 |
| Gloss, 45° dull [2] | 81.5 | 82.5 | 85.5 | 78.5 |
| Specular light transmission [3] | 27.8 | 30.3 | 58.1 | 51.5 |

[1] ASTM test D1003-61. [2] ASTM test D532-62T. [3] ASTM test D1003-61.

EXAMPLE 11

A master batch was prepared from 92 parts of an ethylene/propylene copolymer containing about 2% polymerized ethylene and having an approximate melting temperature of about 143° C. and a melt flow of about 1.5 dg./min. (at 44 p.s.i. and 230° C.) and 8 parts of a cyclic ester substantial homopolymer (PCL) of epsilon-caprolactone made by dispersion polymerization and having a reduced viscosity of about 1.4. The master batch was made in suitable equipment by melt-blending the granular forms of the ethylene/propylene copolymer and PCL. Then various proportions of the master batch were dry blended with the above-described ethylene/propylene copolymer in sufficient amount to provide the concentrations of PCL listed in Table V.

The melt melt-blending to form the master batch and also the final blends was achieved quite readily and uniform blends were obtained in every case.

Each crystalline polymer alloy was extruded as a tube through a one-inch extruder fitted with a one-inch circular die and a bubble of about 2½ inches in diameter was formed from the extruded tube. The thickness of the film making up the bubble or expanded tube was about 20 mils. Thereafter the film bubble or tube was cooled to room temperature and reheated to the orientation temperature range of about 120 to about 125° C. and the tube was further inflated to about 5½ times its diameter. At the same time, the film was pulled at a faster rate than it was being fed to the second bubble and there resulted substantial orientation in the machine direction as well as in the lateral direction. The resulting film was about 0.7 mil thick. The resulting biaxially oriented film was cooled and tested for physical properties, the results of which are listed in Table V below. In addition, the above-described ethylene/propylene copolymer without any PCL addition was extruded and double-bubble oriented in the same manner as decribed above.

As shown by the physical properties listed in Table V, the haze and gloss of the crystalline polymer alloy containing PCL, at the 0.5% level, is significantly improved, without significant loss in other physical properties, as compared to ethylene/propylene films which did not contain PCL.

TABLE V

| | Concentration of PCL, percent | | | |
|---|---|---|---|---|
| | 0 | 0.5 | 1.0 | 2.0 |
| Haze, percent [1] | 0.6 | 0.3 | 0.6 | 0.7 |
| Gloss, 45° dull [2] | 91.7 | 96 | 91 | 87 |
| Modulus of elasticity, p.s.i. [3] | 195,000 | 246,000 | 203,000 | 215,000 |
| Tensile strength, p.s.i. [4] | 18,700 | 19,950 | 18,800 | 19,950 |
| Ultimate elongation, percent [5] | 75 | 42 | 53 | 65 |
| C.O.F. (static) [6] | 0.5 | 0.6 | | |

[1] ASTM test D1003-61. [2] ASTM test D523-62T. [3] ASTM test D882-64T. [4] ASTM test D882-56T. [5] ASTM test D882-56T. [6] ASTM test D1894-63.

EXAMPLE 12

Two dry blends are made from low density polyethylene having a density of 0.922 g./ml. and a melt index of about 2.0 dg./min. and a cyclic ester substantial homopolymer (PCL) comprising a mixture of substantially equal amounts of five batches of such homopolymer prepared by solution polymerization in toluene of epsilon-caprolactone in the presence of di-n-butyl zinc catalyst respectively having reduced viscosities in benzene at 30° C. of 0.88, 1.17, 0.91, 0.88 and 1.07. The five homopolymer batches were dry mixed in equal proportions and the reduced viscosity of the resulting mixture was estimated to be approximately 1.0.

One dry blend contains 0.5% PCL and the other dry blend contains 1.5% PCL. Each of the dry blends is fed into an extruder and a film is formed by conventional blown tubular polyethylene techniques. The extruded film is about 20 mils thick at the orifice die and is blown to an 8-inch diameter. The resulting film is about 1.52 mils thick. The resulting films were tested for optical properties which are given in Table VI in comparison with a control film (containing no PCL) extruded in the same manner.

TABLE VI

| | Concentration of PCL, percent | | |
|---|---|---|---|
| | 0 | 0.5 | 1.5 |
| Haze, percent [1] | 3.8 | 3.1 | 3.1 |
| Gloss, 45° dull [1] | 80 | 77 | 94 |
| Specular light transmission [1] | 82 | 82 | 84 |

[1] ASTM methods identified in Table IV.

EXAMPLE 13

A dry blend is made in the same manner as the ones in Example 12 except that a different low density polyethylene is used, namely a low density polyethylene having a density of 0.917 and a melt index of about 1.3 dg./min. The blend contains 1.5% of the PCL described in Example 12. A film of about 1 and 1½ inch mil is formed in the same manner as described in Example 12 and is tested for optical properties which are listed below in comparison with a control film (without PCL) extruded in the same manner.

TABLE VII

| | Concentration of PCL, percent | |
|---|---|---|
| | 0 | 1.5 |
| Haze, percent [1] | 14 | 15 |
| Gloss, 45° dull [1] | 41 | 34 |
| Specular light transmission [1] | 7.8 | 22 |

[1] ASTM methods identified in Table IV.

EXAMPLE 14

A 5 to 6 mil film is made in the same manner as described in Example 12 using 0.25% of the same PCL homopolymer mixture and using an ethylene vinyl acetate copolymer in place of the low density ethylene described in Example 12. The copolymer contained about 18% vinyl acetate and had a melt index of about 2.0. The 5 to 6 mil film formed had low haze and improved light transmission and gloss properties.

EXAMPLE 15

The polyethylene used in this example was a low density polyethylene having a density of 0.916 to 0.919 g./ml. at 23° C. and a melt index of 1.7 to 2.4.

The cyclic ester polymer (PVL) used in this example was prepared by bulk polymerization of delta-valerolactone using 0.5 mole percent di-n-butyl zinc as catalyst. The polymer had a reduced viscosity of 0.75 dl./gm. in benzene at 30° C. and at a concentration of 0.2 g. of polymer per 100 cc.

These two polymers were blended on a two-roll mill at 120° C. for five minutes in relative proportions providing the PVL percentages listed in Table VIII below. The milling behavior was good except that dispersion was poor with some plate out on the rolls with the 10% blend. Hot strength was fair. The blends were cooled and compression molded into plaques at 500 p.s.i. pressure and 120 to 130° C. for 10 seconds. Tensile properties of these molded articles were determined with an Instron tensile tester and are listed in the table.

TABLE VIII

| Percent PVL | 0 | 0.63 | 2.5 | 10 |
|---|---|---|---|---|
| 1% secant modulus, p.s.i. | 20,300 | 17,500 | 15,200 | 14,800 |
| Tensile strength, p.s.i. | 1,900 | 2,000 | 1,990 | 1,830 |
| Elongation, percent | 900 | 1,470 | 1,600 | 1,470 |
| Rupture energy, in.-lbs./in.³ | 12,000 | 20,800 | 22,700 | 19,500 |

EXAMPLE 16

The polyethylene used in this example was a low density polyethylene with a density of 0.916 to 0.919 at 23° C. and a melt index of 1.7 to 2.4.

The cyclic ester polymer (PKD) was prepared by bulk polymerization of 2-keto-1,4-dioxane using 0.5 mole percent di-n-butyl zinc as catalyst. After polymerization the polymer was dissolved in hot dimethyl formamide and precipitated into methanol. After washing twice with methanol the product was dried in a forced-air oven at 40-50° C. The polymer PKD had a reduced viscosity of 0.42 dl./gm. in chloroform at 30° C. and a concentration of 0.2 g. polymer per 100 ml. solvent.

These polymers were blended on a two-roll mill at 110 to 120° C. for 5 to 10 minutes in relative proportions providing the PKD percentages listed in Table IX below. The milling behavior of the 1%, 5%, and 10% PKD blends was good. After removal from the mill the blends were cooled and subsequently compression molded into plaques. Strips of these plaques were then tested with an Instron tensile tester. The results are summarized in Table IX.

TABLE IX

| Percent PKD | 0 | 1 | 5 | 10 |
|---|---|---|---|---|
| 1% secant modulus, p.s.i. | 20,300 | 16,800 | 22,600 | 22,000 |
| Tensile strength, p.s.i. | 1,900 | 1,800 | 1,700 | 1,500 |
| Elongation, percent | 900 | 1,200 | 1,300 | 1,200 |
| Rupture energy, in.-lbs./in.³ | 12,000 | 16,000 | 17,000 | 15,000 |

EXAMPLE 17

Another blend of the PKD described in Example 16 was made. However, in this case high density polyethylene was used having a density of 0.960 gm./cc. and a melt index of 5.0.

The two polymers were blended on a two-roll mill at 140° C. for 5 minutes. Milling behavior was good. The blend was cooled and a plaque was compression molded. Tensile properties were determined with an Instron tensile tester and an average value of two tests is listed in Table X.

TABLE X

| Percent PKD | 0 | 10 |
|---|---|---|
| 1% secant modulus, p.s.i. | 100,000 | 103,000 |
| Tensile strength, p.s.i. | 2,600 | 2,500 |
| Elongation, percent | 900 | 80 |
| Rupture energy, in.-lbs./in.³ | 23,000 | 2,200 |

EXAMPLE 18

The polypropylene used in this example had a melt index of 7.2 at 200° C., 10.9 at 220° C., and 4.15 at 280° C.

The cyclic ester polymer (PKD) used was the same as that described in Example 16.

The two polymers were blended on a two-roll mill at 160° C. for 10 minutes. Milling behavior was good overall with some difficulty in banding the 10% blends. The blends were removed from the mill, cooled, and subsequently compression molded into plaques at 170° C., 1000 p.s.i., and 10 seconds time. Plaques were cut into strips, and tensile properties were determined on these strips with an Instron tensile tester. The results of these tests are summarized in Table XI. Strip size was about 0.25 inch wide, one inch long and 0.030 inch thick.

TABLE XI

| Percent PKD | 0 | 5 | 10 |
|---|---|---|---|
| 1% secant modulus, p.s.i. | 102,000 | 112,000 | 116,000 |
| Tensile strength, p.s.i. | 4,100 | 3,800 | 3,000 |
| Elongation, percent | 10 | 23 | 16 |
| Rupture energy, in.-lbs./in.³ | 364 | 860 | 380 |

EXAMPLE 19

The polyethylene used was a low density polyethylene having a density of 0.916 to 0.919 at 23° C. and a melt index of 1.7 to 2.4.

The cyclic ester polymer (PEL) used in this example was prepared by bulk polymerization of zeta-enantholactone using 0.5 mole percent di-n-butyl zinc as catalyst. The polymer had a reduced viscosity of 0.61 dl./gm.

The polymers were blended on a two-roll mill at 110° C. for 5 minutes. All aspects of the milling behavior were good. The blend was removed from the mill, cooled, and then compression molded into plaques. Tensile properties were determined on strips cut from the plaques with an Instron tensile tester. These properties are listed in Table XII.

TABLE XII

| Percent PEL | 0 | 10 |
|---|---|---|
| 1% secant modulus, p.s.i. | 20,300 | 20,100 |
| Tensile strength, p.s.i. | 1,900 | 1,600 |
| Elongation, percent | 900 | 1,250 |
| Rupture energy, in.-lbs./in.³ | 12,000 | 15,600 |

Substantially similar results are obtained as in respectively Examples 5, 6 and 10 through 13 when the substantial homopolymers of and copolymers of two or more of the following cyclic esters are respectively substituted for the epsilon-caprolactone polymer in each of these examples:

delta-valerolactone,
zeta-enantholactone,
eta-caprylolactone,
monomethyl-delta valerolactone,
monohexyl-delta-valerolactone,
tri-n-propyl-epsilon-caprolactone,
monomethoxy-delta-valerolactone,
diethoxy-delta-valerolactone,
diethyl-epsilon-caprolactone and
monoisopropoxy-epsilon-caprolactone.

Substantially similar results are obtained as in Example 2 when, respectively, crystalline poly(4-methyl-1-pentene) and crystalline poly(3-methyl-1-butene) are substituted for the high density polyethylene employed in Example 2.

What is claimed is:

1. A substantially crystalline solid polymer blend comprising (i) a substantially crystalline alkene polymer of the group consisting of homopolymers of monoolefins and copolymers of monoolefins with minor amounts of ethylenically unsaturated comonomers; and (ii) a substantially crystalline cyclic ester polymer having a reduced viscosity of at least 0.1 as determined at a concentration of 0.2 gram of said polymer in 100 milliliters of benzene at 30° C.; said cyclic ester polymer consisting essentially of recurring Units I of the formula:

(I) 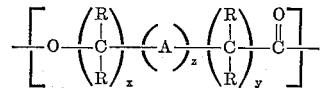

wherein each R, individually, is selected from the class consisting of hydrogen, alkyl, halo and alkoxy; A is the oxy group; $x$ is an integer from 1 to 4; $y$ is an integer from 1 to 4; $z$ is an integer of zero or one; with the provisos that (a) the sum of $x+y+z$ is at least 4 and not greater than 7, and (b) the total number of R variables which are substituents other than hydrogen does not exceed 3; or said cyclic esters consisting essentially of recurring Units I above and up to 30 mol percent of recurring Units II of the formula (II) 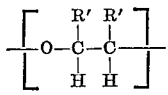

wherein each R′, individually is selected from the class consisting of hydrogen, alkyl, cycloalkyl, aryl, and chloroalkyl, and, together with the ethylene moiety of the oxyethylene chain of Unit II, a saturated cycloaliphatic hydrocarbon ring having from 4 to 8 carbon atoms.

2. A substantially crystalline solid polymer blends as claimed in claim 1 wherein said crystalline alkene polymer is crystalline polyethylene.

3. A substantially crystalline solid polymer blend as claimed in claim 1 wherein said crystalline alkene polymer is crystalline polypropylene.

4. A substantially crystalline solid polymer blends as claimed in claim 1 wherein said crystalline alkene polymer is crystalline poly(4-methylpentene-1).

5. A substantially crystalline solid polymer blend as claimed in claim 1 wherein said crystalline alkene polymer is crystalline poly(3-methylbutene-1).

6. A substantially crystalline solid polymer blend as claimed in claim 1 wherein said crystalline alkene polymer is crystalline ethylene/propylene copolymer.

7. A substantially crystalline solid polymer blend as claimed in claim 1 wherein said crystalline alkene polymer is crystalline.ethylene/vinyl acetate copolymer.

8. A substantially crystalline solid polymer blend as claimed in claim 1 containing about 0.25 to about 90 weight percent of said crystalline cyclic ester polymer and about 99.75 to about 10 weight percent of said crystalline alkene polymer.

9. A substantially crystalline solid polymer blend as claimed in claim 1 wherein said crystalline cyclic ester polymer is present in the amount of about 0.5 to about 15 weight percent and said crystalline alkene polymer is present in the amount of about 99.5 to about 85 weight percent.

10. A substantially crystalline solid polymer blend as claimed in claim 1 wherein said crystalline cyclic ester polymer consists essentially of recurring Units I and up to 30 mol percent of recurring Units II.

11. A substantially crystalline solid polymer blend as claimed in claim 1 wherein said crystalline cyclic ester polymer consists essentially of units having the formula:

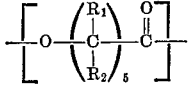

wherein each $R_1$ is of the group consisting of hydrogen and methyl, with the proviso that no more than three $R_1$ substituents are groups other than hydrogen.

12. A substantially crystalline solid polymer blend as claimed in claim 2 wherein said crystalline cyclic ester polymer consists essentially of units having the formula:

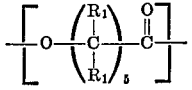

wherein each $R_1$ is of the group consisting of hydrogen and methyl, with the proviso that no more than three $R_1$ substituents are groups other than hydrogen.

13. A substantially crystalline solid polymer blend as claimed in claim 3 wherein said crystalline cyclic ester polymer consists essentially of units having the formula:

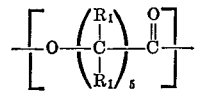

wherein each $R_1$ is of the group consisting of hydrogen and methyl, with the proviso that no more than three $R_1$ substituents are groups other than hydrogen.

14. A substantially crystalline solid polymer blend as claimed in claim 4 wherein said crystalline cyclic ester polymer consists essentially of units having the formula:

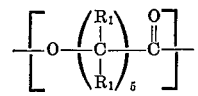

wherein each $R_1$ is of the group consisting of hydrogen and methyl, with the proviso that no more than three $R_1$ substituents are groups other than hydrogen.

15. A substantially crystalline solid polymer blend as claimed in claim 5 wherein said crystalline cyclic ester polymer consists essentially of units having the formula:

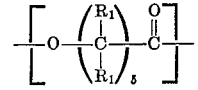

wherein each $R_1$ is of the group consisting of hydrogen and methyl, with the proviso that no more than three $R_1$ substituents are groups other than hydrogen.

16. A substantially crystalline solid polymer blend as claimed in claim 6 wherein said crystalline cyclic ester polymer consists essentially of units having the formula:

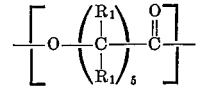

wherein each $R_1$ is of the group consisting of hydrogen and methyl, with the proviso that no more than three $R_1$ substituents are groups other than hydrogen.

17. A substantially crystalline solid polymer blend as claimed in claim 7 wherein said crystalline cyclic ester polymer consists essentially of units having the formula:

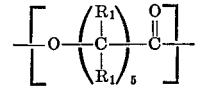

wherein each $R_1$ is of the group consisting of hydrogen and methyl, with the proviso that no more than three $R_1$ substituents are groups other than hydrogen.

18. A substantially crystalline solid polymer blend as claimed in claim 10 wherein said Units II are oxyethylene units.

References Cited

UNITED STATES PATENTS

| | | | |
|---|---|---|---|
| 3,324,070 | 6/1967 | Hostettles et al. | 260—32.2 |
| 3,305,605 | 2/1967 | Hostettles et al. | 260—873 |
| 3,169,945 | 2/1965 | Hostettles et al. | 260—78.3 |

MURRAY TILLMAN, Primary Examiner

C. J. SECCURO, Assistant Examiner

U.S. Cl. X.R.

8—31, 180; 260—41 C, 78.3, 897 R, 897 B, 289, 290